(12) United States Patent
Cherry et al.

(10) Patent No.: US 6,925,752 B1
(45) Date of Patent: Aug. 9, 2005

(54) INSECT LURE AND TRAP SYSTEM

(75) Inventors: James R. Cherry, Windham, NH (US); David P. Stevens, Billerica, MA (US); Sal G. DeYoreo, Andover, MA (US)

(73) Assignee: Armatron International, Inc., Melrose, MA (US)

( * ) Notice: Subject to any disclaimer, the term of this patent is extended or adjusted under 35 U.S.C. 154(b) by 0 days.

(21) Appl. No.: 10/077,175

(22) Filed: Feb. 15, 2002

Related U.S. Application Data

(60) Provisional application No. 60/268,976, filed on Feb. 15, 2001.

(51) Int. Cl.[7] .............................. A01M 1/02; A01M 1/06
(52) U.S. Cl. ........................................... 43/139; 43/107
(58) Field of Search ........................... 43/107, 112, 113, 43/139

(56) References Cited

U.S. PATENT DOCUMENTS

| | | | | |
|---|---|---|---|---|
| 4,519,776 A | * | 5/1985 | DeYoreo et al. | 43/107 |
| 6,145,243 A | * | 11/2000 | Wigton et al. | 43/139 |
| 6,594,944 B2 | * | 7/2003 | Chura | 43/112 |
| 6,594,946 B2 | * | 7/2003 | Nolen et al. | 43/107 |
| 6,655,078 B2 | * | 12/2003 | Winner et al. | 43/107 |
| 6,662,489 B2 | * | 12/2003 | Spiro et al. | 43/107 |
| 6,779,296 B1 | * | 8/2004 | Mosher, II | 43/107 |
| 6,817,140 B1 | * | 11/2004 | Durand et al. | 43/139 |
| 2003/0084604 A1 | * | 5/2003 | Durand et al. | 43/139 |
| 2004/0139648 A1 | * | 7/2004 | Durand et al. | 43/139 |
| 2004/0237382 A1 | * | 12/2004 | Durand et al. | 43/139 |

FOREIGN PATENT DOCUMENTS

| WO | WO-99/37145 A1 | * | 7/1999 |
|---|---|---|---|
| WO | WO-03/028448 A2 | * | 4/2003 |

\* cited by examiner

*Primary Examiner*—Darren W. Ark
(74) *Attorney, Agent, or Firm*—Gauthier & Connors

(57) ABSTRACT

An insect lure and trap system includes a valve that receives a gaseous fuel, and provides a regulated flow of gaseous fuel. The regulated flow of gaseous fuel is input to an exothermic reactor that generates carbon dioxide to attract insects to a predetermined region, where a generated airflow forces insects within the predetermined region into a container. A temperature sensor senses the temperature of the carbon dioxide and provides a carbon dioxide temperature signal indicative thereof to a controller, which generates a valve command signal that regulates the valve in response to the carbon dioxide temperature signal. Advantageously, operating closed loop on catalyst temperature (i.e., gas temperature measured at the catalyst) allows for a more efficient use of the fuel, which is used to generate the $CO_2$ attractant.

12 Claims, 20 Drawing Sheets

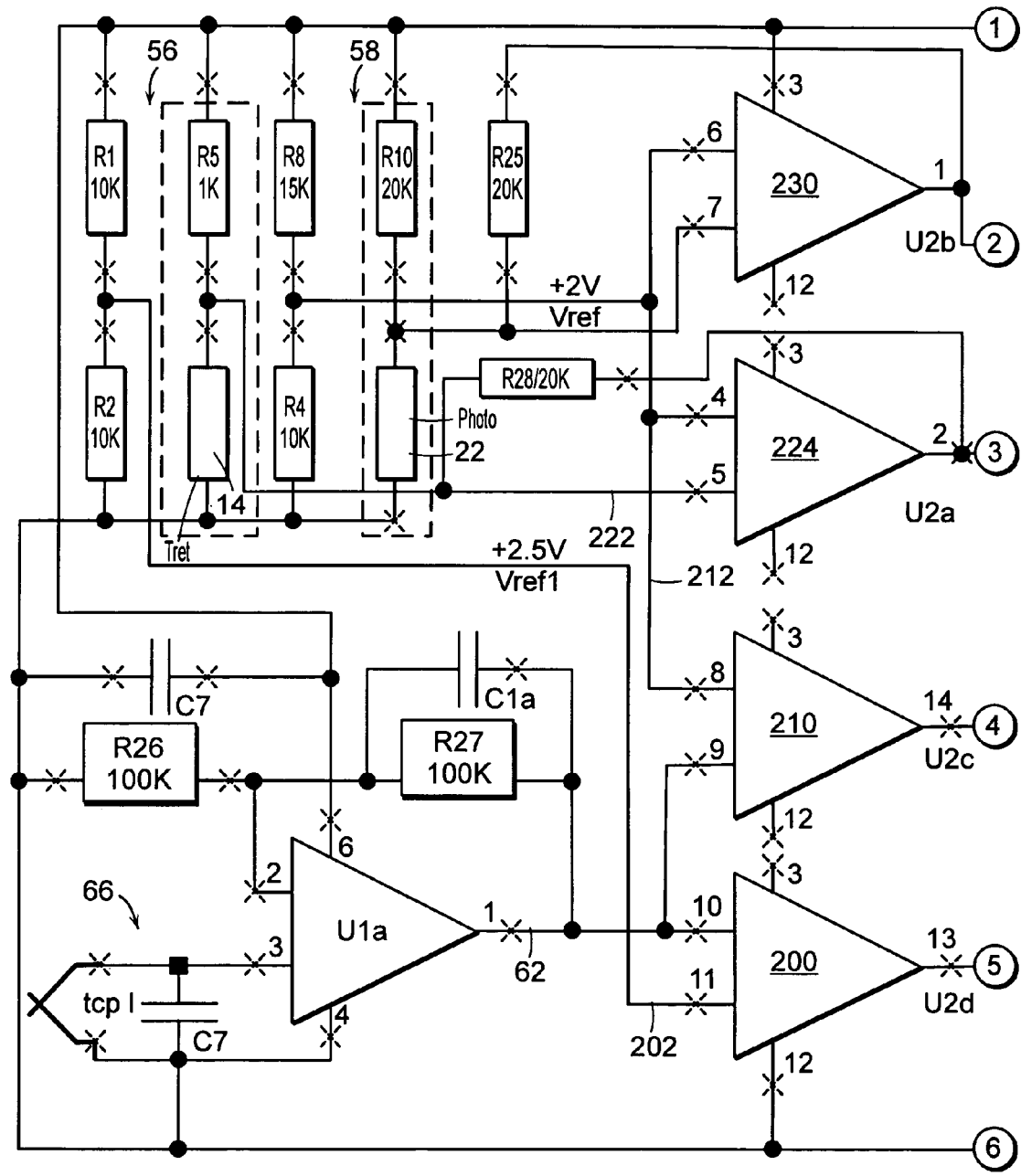
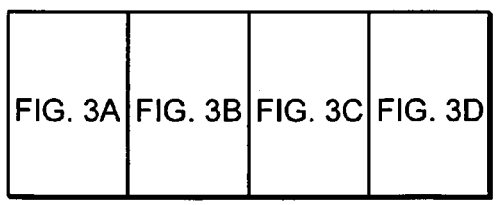
FIG. 3A
FIG. 3

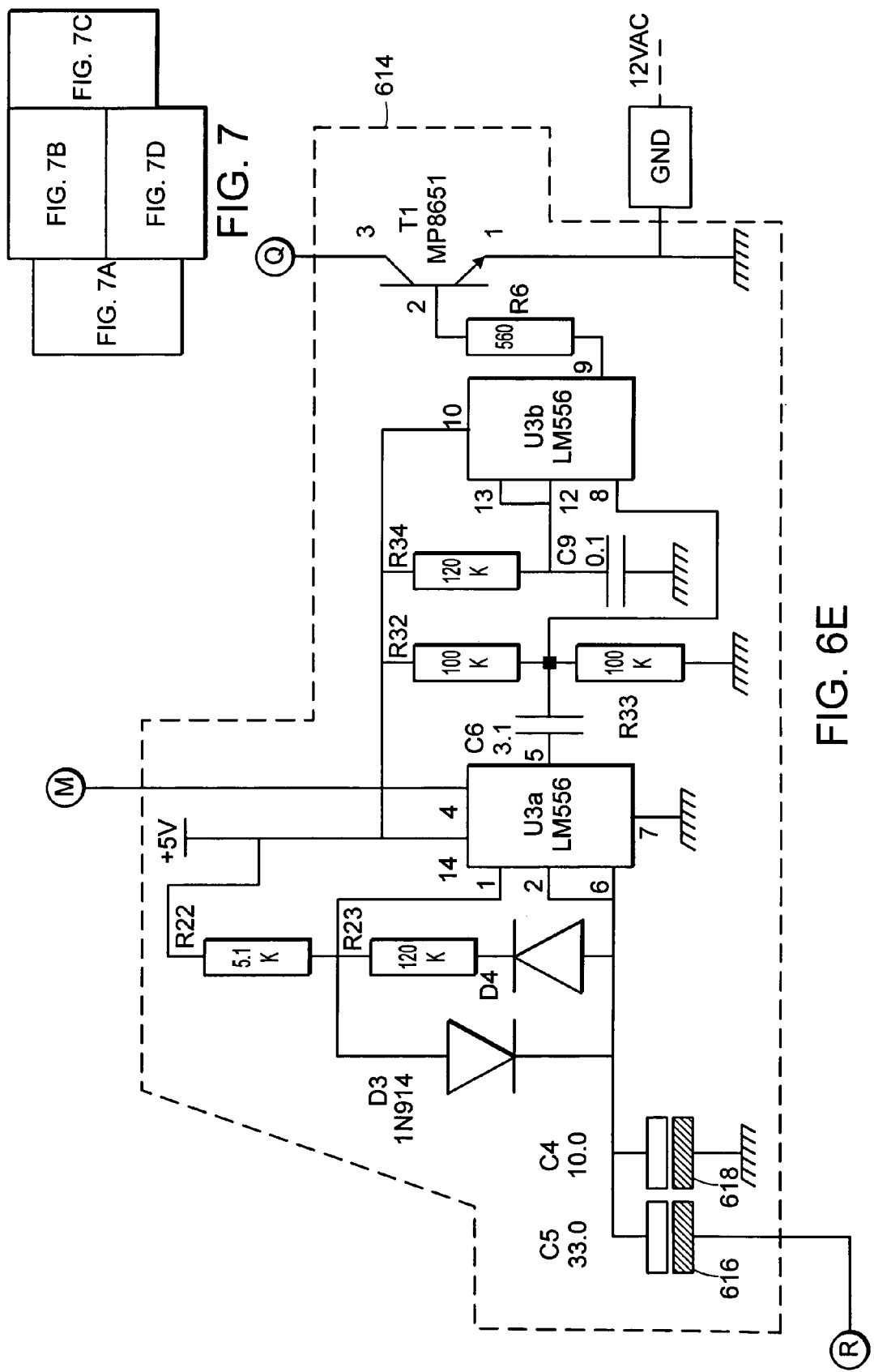

INSECT LURE AND TRAP SYSTEM

PRIORITY DATA

This application claims priority from a provisional application filed Feb. 15, 2001 designated Ser. No. 60/268,976 entitled "Insect Lure and Trap System". This application is incorporated herein by reference.

BACKGROUND OF THE INVENTION

The present invention relates to the field of devices for trapping insects, and in particular to an insect lure and trap system that uses a carbon dioxide ($CO_2$) attractant.

It is known to use a carbon dioxide attractant to lure insects into a trap. For example, U.S. Pat. No. 6,145,243 entitled "Method and Device Producing $CO_2$ Gas for Trapping Insects" discloses a device for attracting and trapping bothersome flying insects. A problem with this system is that it is manually controlled to turn on and off. Specifically, operation of the system cannot start until the propane-air mixture within a combustion chamber is ignited by a spark. This system is obviously rather cumbersome since it requires manual intervention to initiate system operation. Similarly, the system requires manual intervention to turn the system off. Along with the bothersome requirement of manually turning the system on and off, the system will often undesirably operate when the insects are no longer a factor (e.g., after dark), thus unnecessarily using the propane.

U.S. Pat. No. 5,813,166 also discloses a system that employs carbon dioxide attractant to lure insects into a trap. The system includes a control system that allows a user to program the system to turn-on and off based upon a time schedule, or based upon dawn and dusk as sensed by a photocell. The control system includes electronics that turns on and off the flow of carbon dioxide ($CO_2$) from a tank and releases the $CO_2$ in a constant pulsing pattern to simulate breathing. Specifically, the electronics commands the release of $CO_2$ into the air for a duration of about 100 milliseconds every two seconds to rhythmically raise and lower the concentration of $CO_2$ in the vicinity of the trap, similar to the breathing pattern. The control system drives a solenoid valve that opens and closes a flow path for the $CO_2$. However, a problem with this system is that it operates open loop and does not regulate the flow of $CO_2$. Another problem with this system is that it employs a tank of $CO_2$ to provide the gas, rather than generating the $CO_2$. In addition, the $CO_2$ is at ambient temperature (i.e., the gas is not heated).

Therefore, there is a need for an automatically controlled system that attracts insects using a $CO_2$ attractant, and traps the insects.

SUMMARY OF THE INVENTION

Briefly, according to an aspect of the invention, an insect lure and trap system includes a valve that receives a gaseous fuel, and provides a regulated flow of gaseous fuel. The regulated flow of gaseous fuel is input to an exothermic reactor that generates carbon dioxide to attract insects to a predetermined region, where a generated airflow forces insects within the predetermined region into a container. A temperature sensor senses the temperature of the carbon dioxide and provides a carbon dioxide temperature signal indicative thereof to a controller, which generates a valve command signal that regulates the valve in response to the carbon dioxide temperature signal.

Advantageously, operating closed loop on catalyst temperature (i.e., gas temperature measured at the catalyst) allows for a more efficient use of the fuel, which is used to generate the $CO_2$ attractant.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
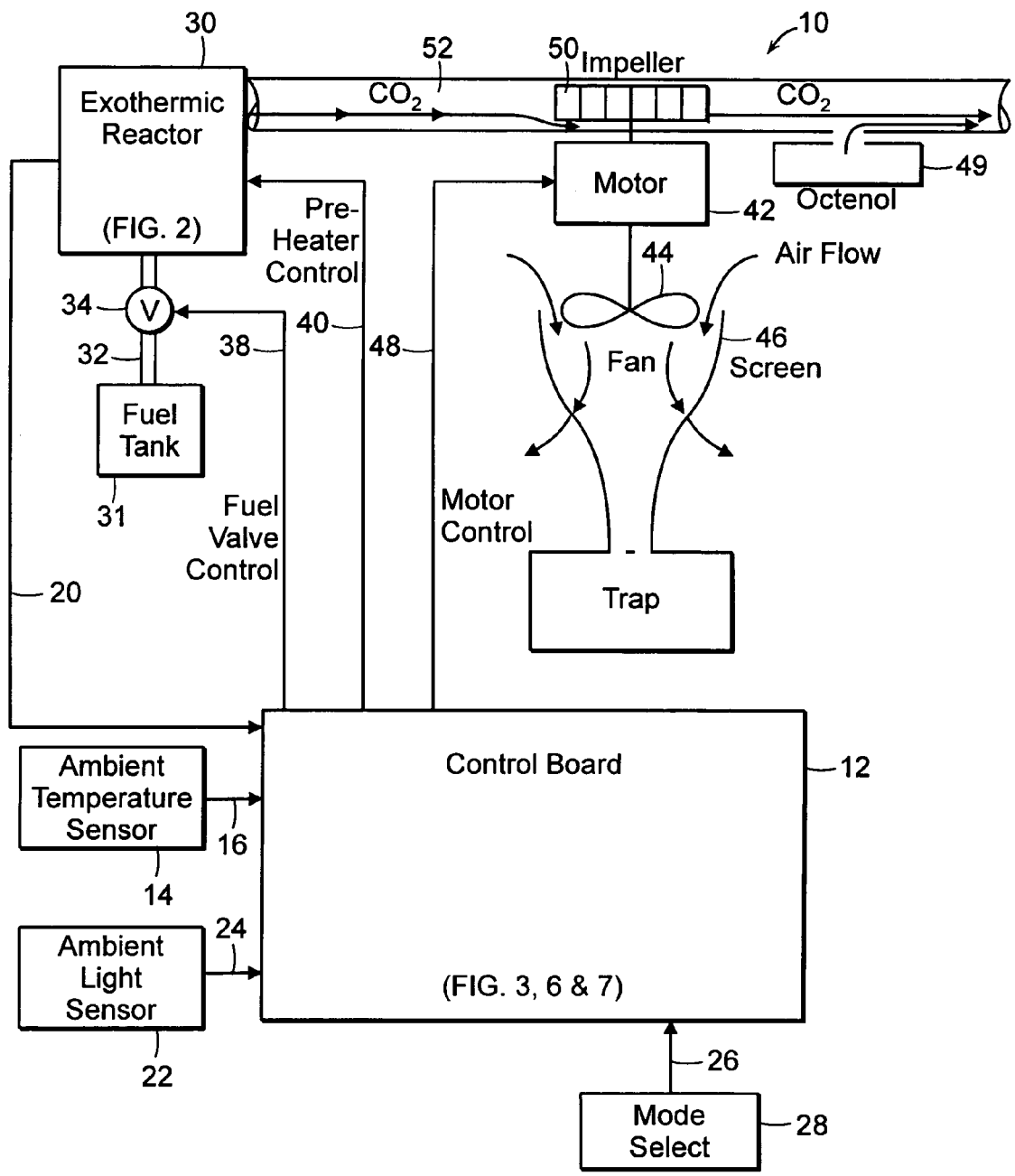
FIG. 1 illustrates a functional block diagram of an insect lure and trap system.

FIG. 1 illustrates a functional block diagram of an insect lure and trap system 10. The system 10 includes a controller 12 that receives a plurality of input signals and controls a plurality of output devices to control the operation of the system. The controller 12 comprises a controller/microprocessor (not shown) that executes program instructions to read the various input signals and control the output devices.

The system includes an ambient temperature sensor 14 that provides a signal on a line 16 to the controller 12, and an ambient light sensor 22 (e.g., a photocell) that provides a signal on a line 24 indicative of the amount of ambient light. A mode select signal on a line 26 is received from a mode select panel 28 that allows a user to select the operating mode of the system. Details of the various modes shall be discussed below.

Figure 2:
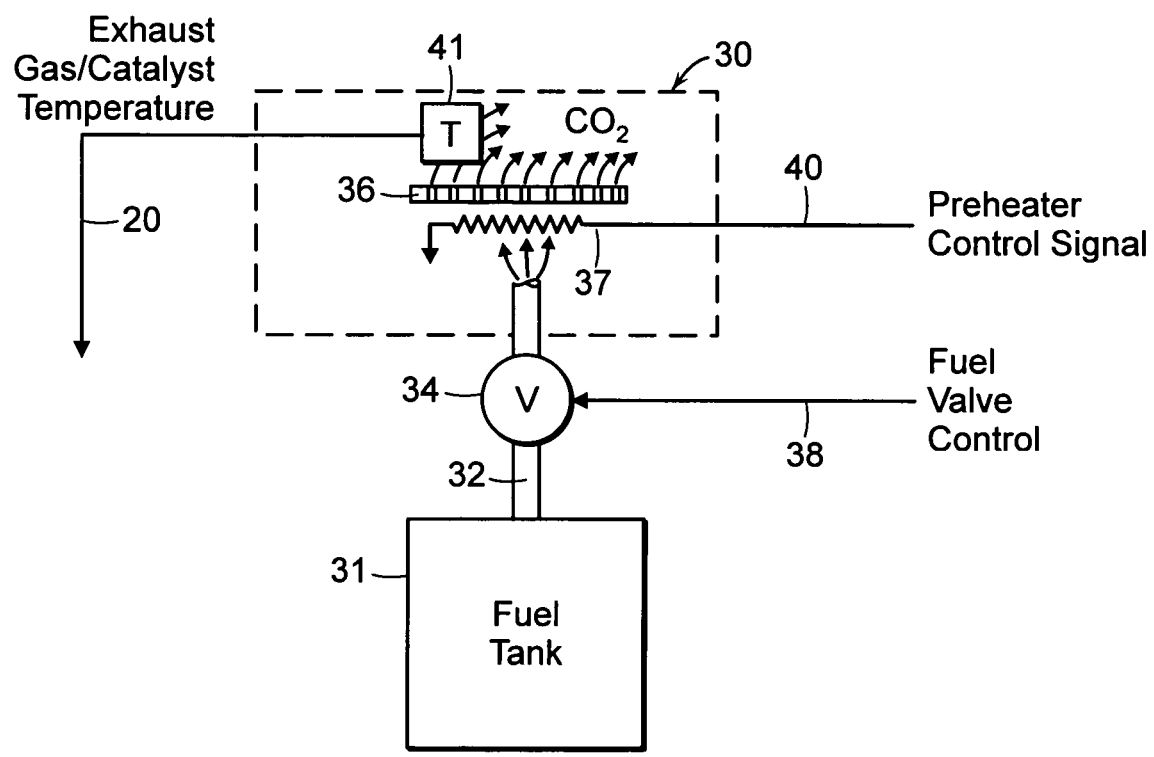
FIG. 2 is a simplified illustration of an arrangement of an exothermic reactor, the fuel tank and valve.

The system also includes an exothermic reactor 30 that generates carbon dioxide ($CO_2$) gas that is used as an attractant. A tank 31 (e.g., removable and disposable) that provides a gas fuel (e.g., propane, butane, methanol, or any low molecular weight paraffin gas) via a flow line 32 to an ON/OFF valve 34, which receives a valve command signal on a line 38 from the controller. When the valve 34 is open, fuel is released to the exothermic reactor 30. FIG. 2 is a simplified illustration of an arrangement of the exothermic reactor 30. Referring to FIG. 2, the fuel from the valve through a catalyst 36, adjacent to which is positioned a heater 37. The catalyst 34 may include a ceramic honeycomb material that is coated with platinum or palladium metal. The heater 37 is mounted preferably directly below the catalyst 36. In one embodiment the heater 37 may be a resistive heating element that receives a pre-heater control signal on a line 40. The heater 37 is provided to initially heat the catalyst 36 to a point the catalyst can begin the self-sustaining exothermic reaction that generates the $CO_2$, as the fuel passes through the catalyst. The control signal on the line 40 commands the heater on and off. A temperature sensor 41 (e.g., a thermocouple) is preferably located above the catalyst 36 to sense the temperature of the $CO_2$ gas passing through the catalyst, and the temperature sensor 41 provides a temperature signal indicative thereof on a line 20.

Referring again to FIG. 1, the trap system 10 also includes a motor 42 that drives a fan 44, which provides air flow through a screen 46 causing insects to be trapped on an interior side of the screen 46. The controller 12 provides a motor command signal on a line 48 to the motor 42. This command signal commands the motor on and off. The motor also drives an impeller 50 located in a flow path of the $CO_2$ gas, to facilitate exhausting the $CO_2$. The system may also include an Octenol reservoir (e.g., removable and replaceable time release cartridge) that releases Octenol to create a $CO_2$ and Octenol mix.

The operation of the catalyst 36 and specifically the generation of the $CO_2$ is substantially the same as disclosed in U.S. Pat. No. 4,519,776 entitled "Apparatus for Attracting Insects", assigned to Armatron International, Incorporated, the assignee of the present invention, and incorporated herein by reference. However, unlike the device disclosed in U.S. Pat. No. 4,519,776, the insect lure and trap system of the present invention includes an automatic control system that monitors various sensors and automatically controls the flow of fuel to ensure the system operates only when needed.

Figure 3B:
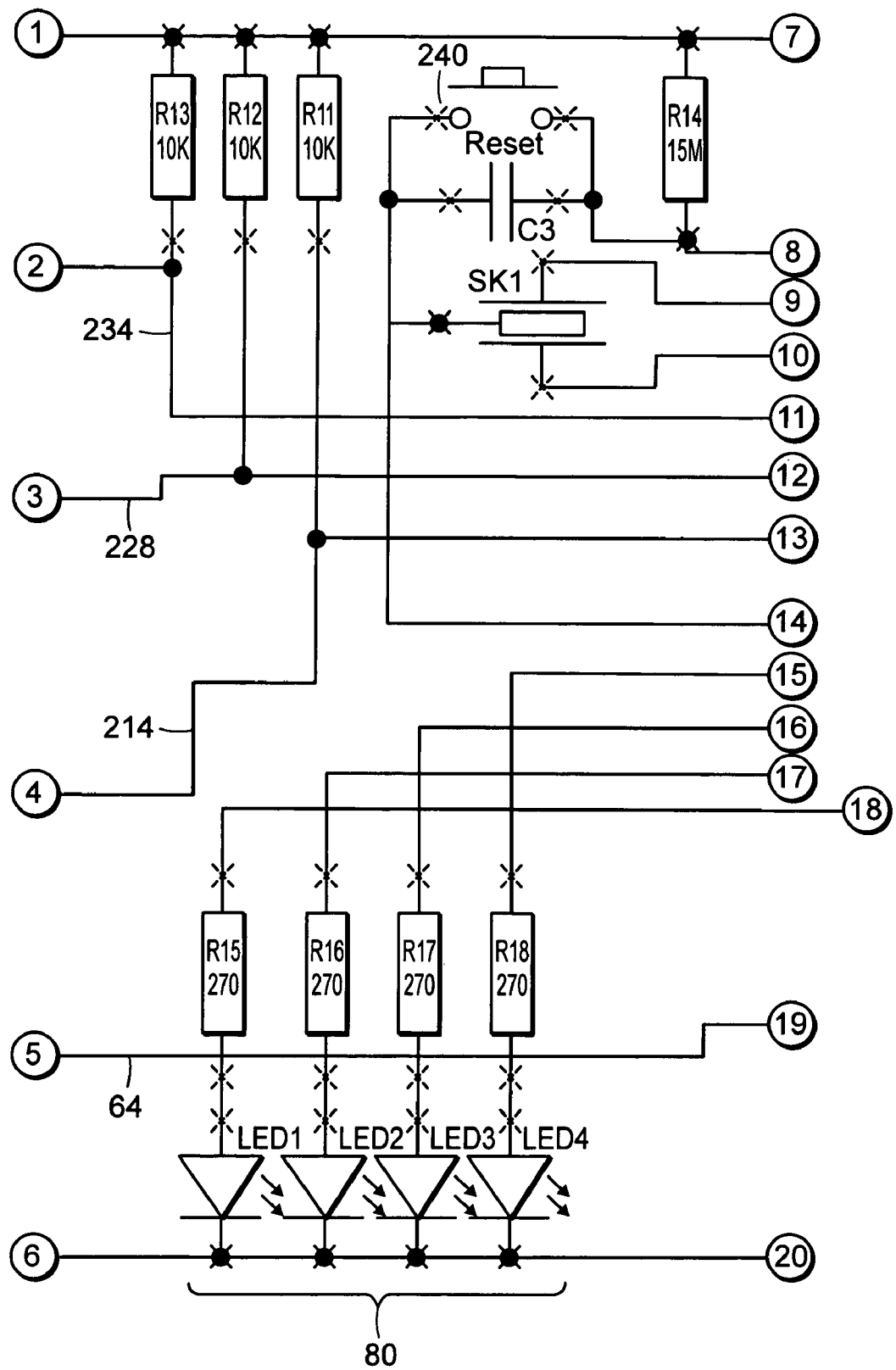
FIG. 3 is a schematic illustration of the controller.
Figure 3C:
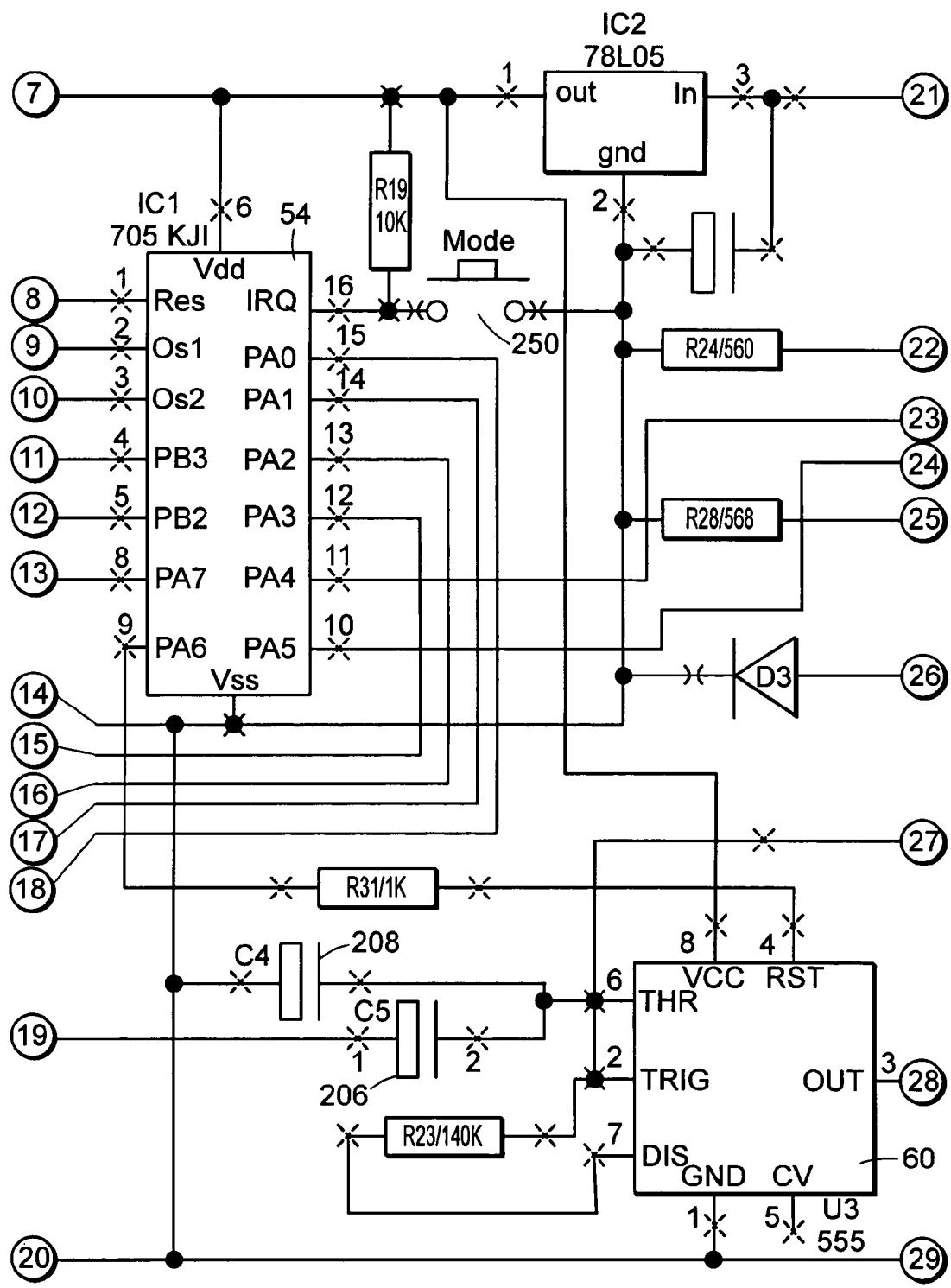
Figure 3D:
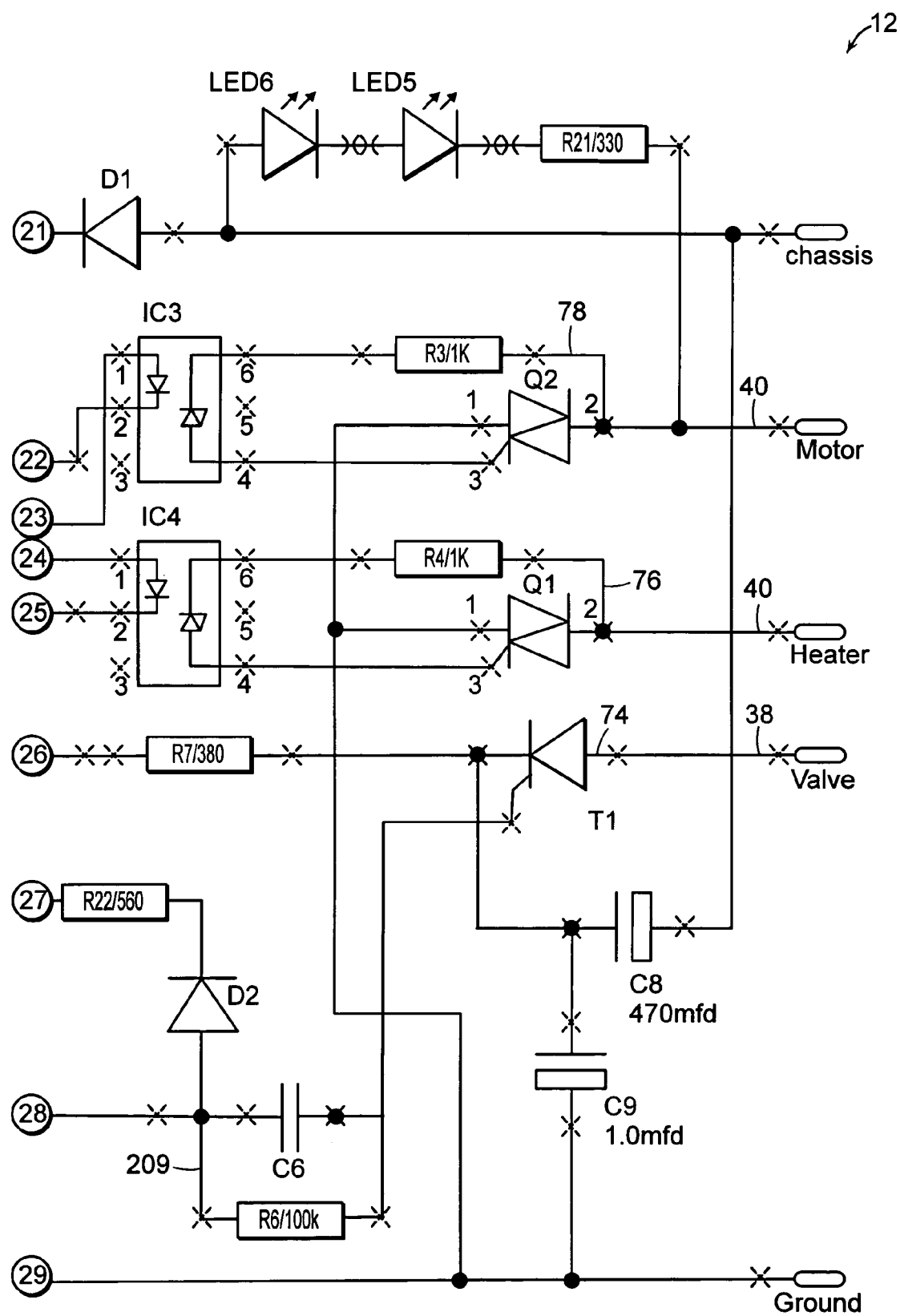

FIG. 3 is a schematic illustration of the controller 12. A microcontroller 54 includes executable program instructions to implement the system's various operating modes. A first resistor bridge 56 is configured and arranged to cooperate with the ambient temperature sensor 14 (FIG. 1), which is preferably a thermistor. A second resistor bridge 58 is configured and arranged to cooperate with the photocell 22 (FIG. 1) to provide a signal indicative of the amount of ambient light to the microcontroller. An oscillator/timer circuit 60 (e.g., an LM555 available from National Semiconductor) controls the fuel valve command signal on the line 38 (FIG. 2) in order to control/modulate the amount of fuel flowing from the tank 31 (FIG. 2). A thermocouple input interface 66 cooperates with the thermocouple 41 (FIG. 2) that senses the exhaust temperature (i.e., the temperature at the catalyst). A sensed temperature signal on a line 64 is provided to the timer 60 to set the rate that the valve 34 (FIG. 2) is opened and closed. That is, the thermocouple 41 (FIG. 2) provides an input signal to the thermocouple interface 66, and the signal is amplified and filtered, and the resultant amplified signal on the line 62 is input to a comparator 200. The comparator 200 also receives a reference signal (e.g., 2.5 VDC) on a line 202. If the value of the amplified signal on the line 62 is greater than value of the reference signal (which is representative of a temperature of about 850° F.) on the line 202, the comparator 200 (in one embodiment an open collector output device) provides a first output signal on the line 64, which is input to a capacitor 206. In this situation, the timer 60 may be configured to command the valve 34 (FIG. 2) to open for a period of about 25 milliseconds, once every second. Of course this frequency and duty cycle are a design choice. As the temperature of the catalyst increases, the value of the amplified signal on the line 62 increases, and the comparator 200 provides a second output signal on the line 64. As a result, the capacitor 206 is electrically in parallel with capacitor 208. This causes the timer 60 to provide an output signal on a line 209 that commands the valve 34 (FIG. 2) to open for a period of about 25 milliseconds once every four seconds (i.e., at lower frequency value). Significantly, this control technique intelligently regulates the opening and closing of the valve as a function of catalyst temperature. That is, the flow of $CO_2$ is controlled as a function of the temperature sensed at the catalyst. The thermocouple 41 (FIG. 2) is mounted in close proximity to the catalyst (e.g., preferably adjacent to and in the flow path catalyst).

Referring still to FIG. 3, the valve 34 (FIG. 2) is driven by a silicon controlled rectifier 74. The heater 37 (FIG. 2) is switched on and off by a triac Q1 76, while a triac Q2 78 turns on and off the motor 42 (FIG. 1) that drives the impeller 50 (FIG. 1) to exhaust the $CO_2$—Octenol attractant and the fan 44 (FIG. 1) that draws in outside air and mosquitoes. LEDs 80 are provided to indicate the operating mode of the system.

Figure 4:
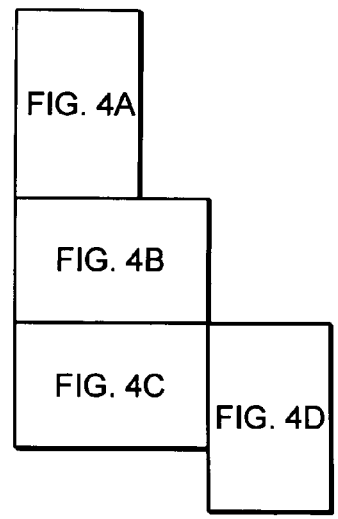
FIG. 4 is a flow chart illustration of the system operation.
Figure 4A:
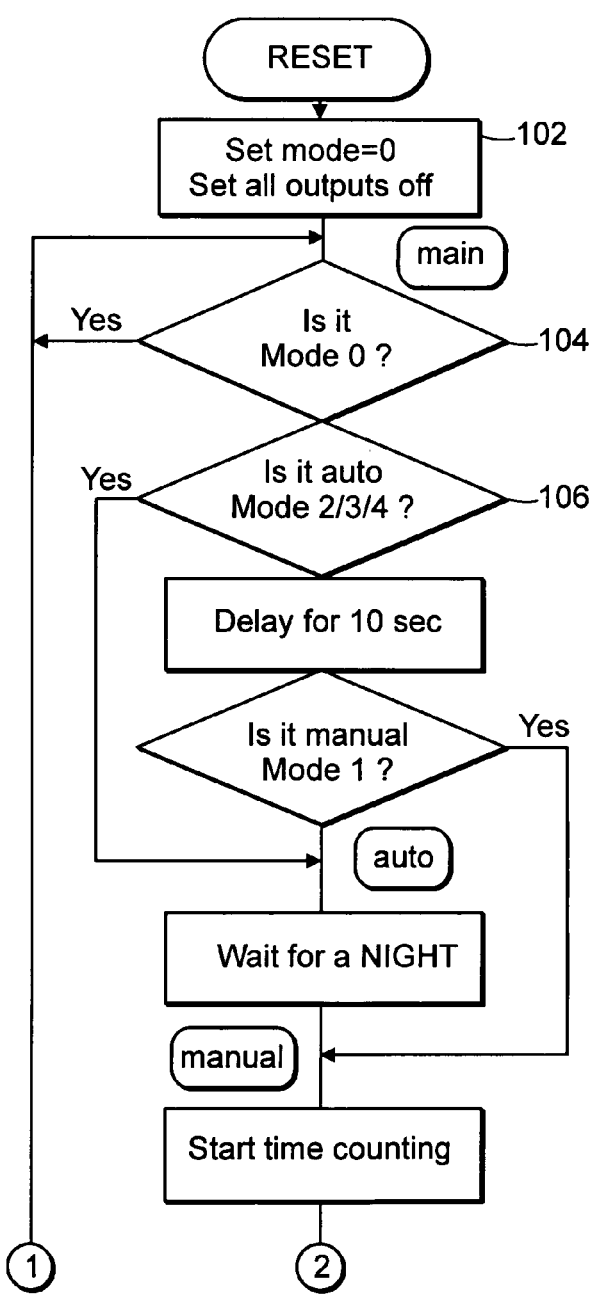
Figure 4B:
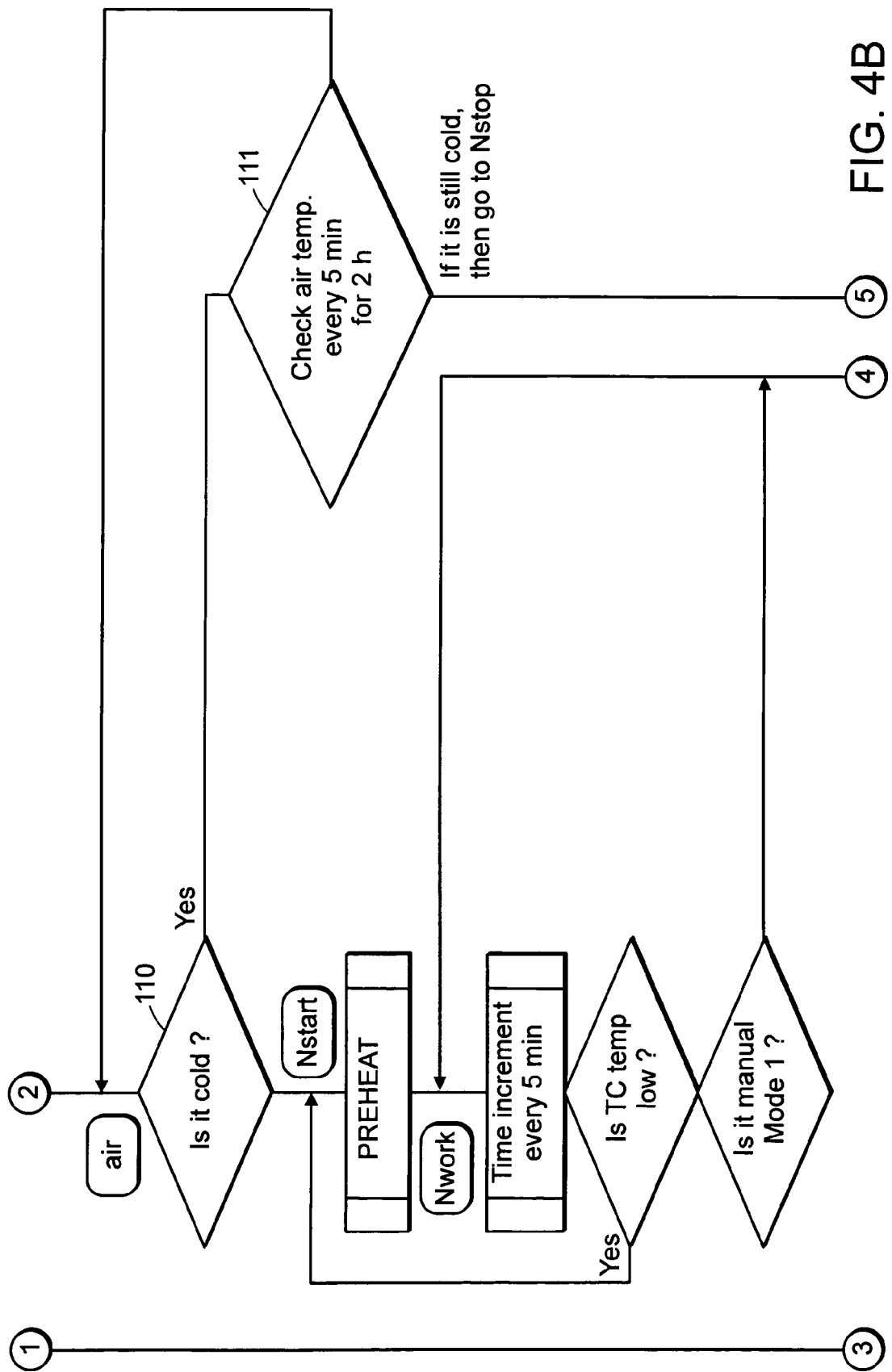
Figure 4C:
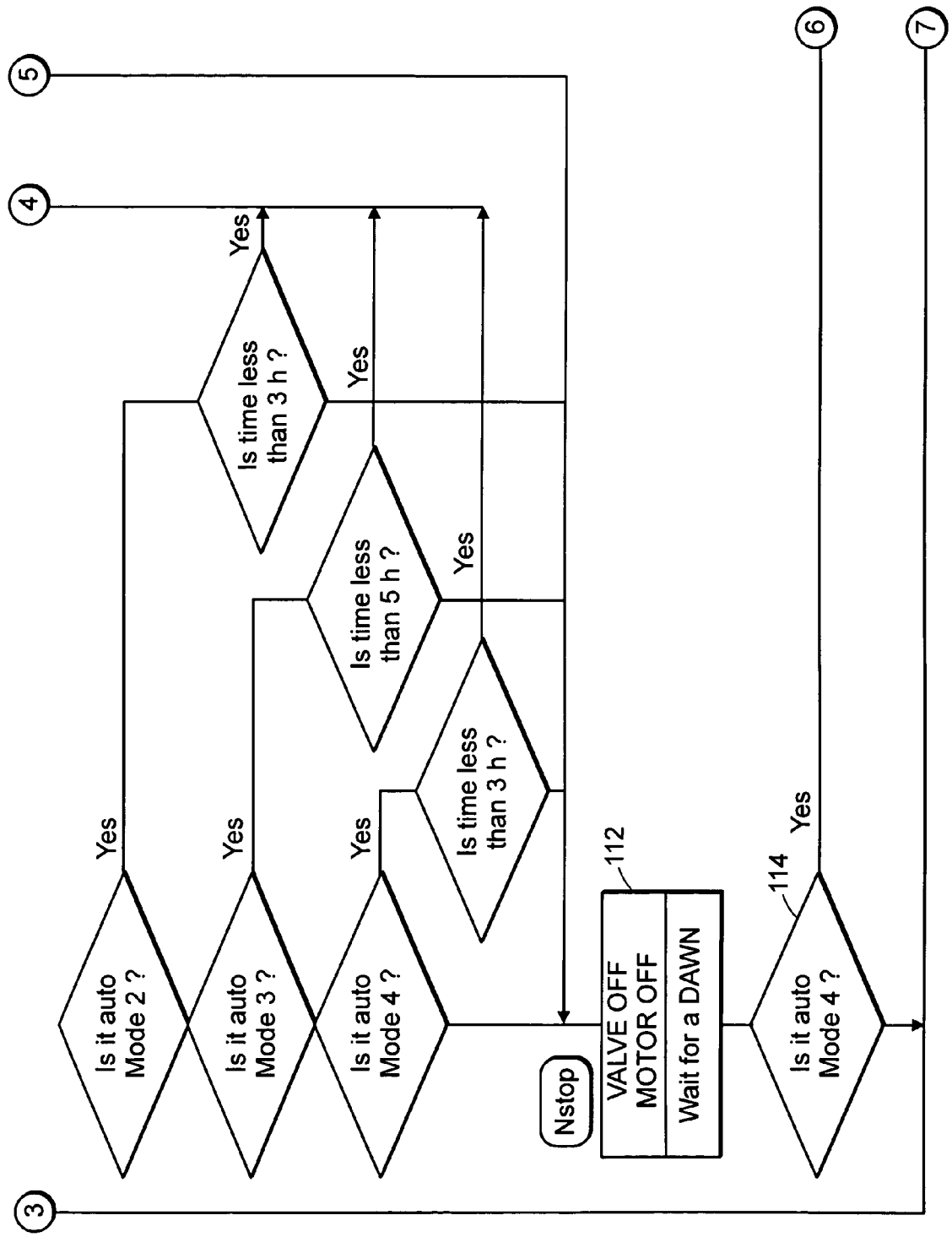
Figure 4D:
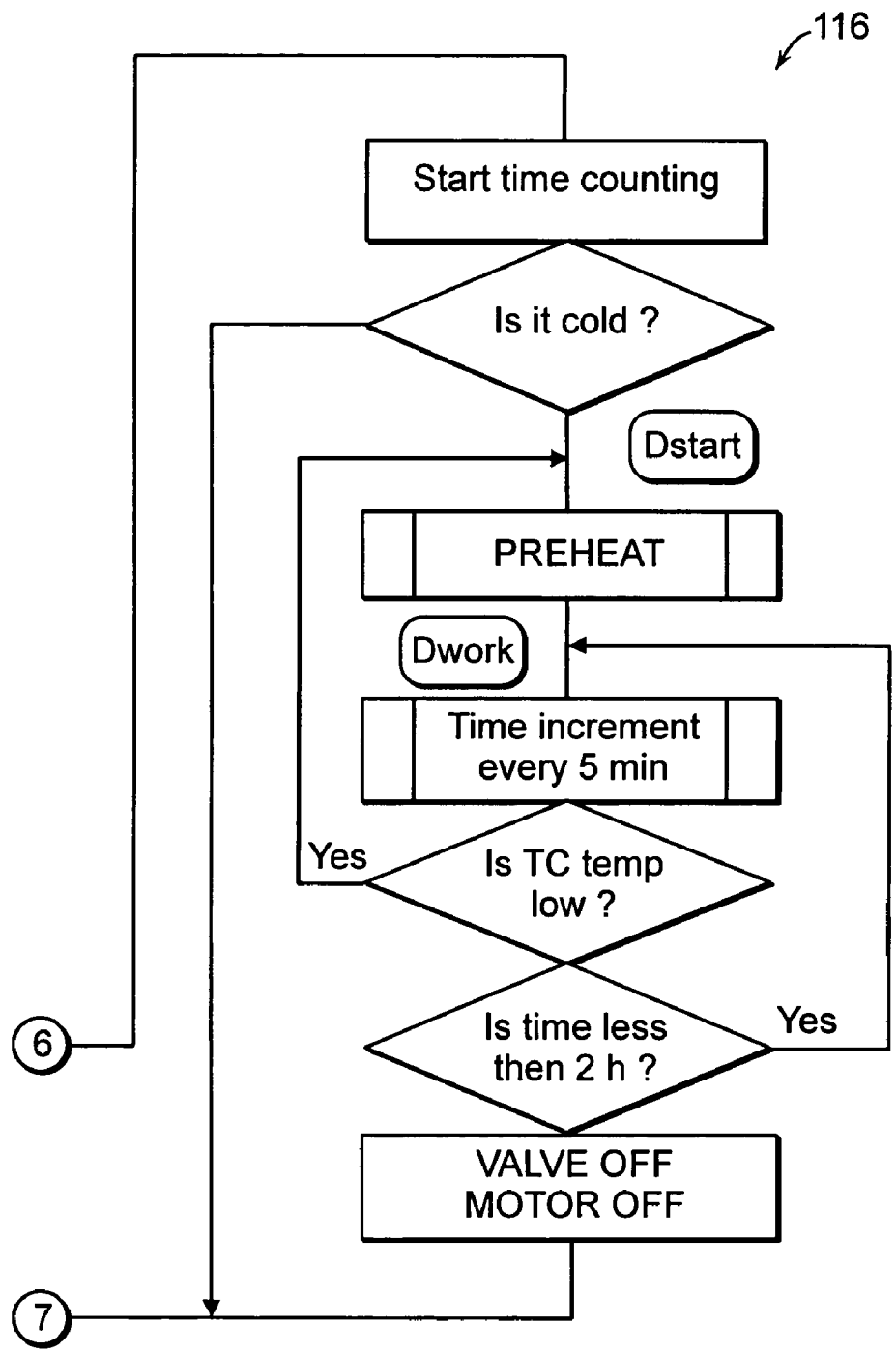

FIG. 4 is a flow chart illustration 100 of the system operation. Following a system reset/power-up, step 102 is performed to set the mode equal to 0 and command all the outputs off. Test 104 is performed to determine if the mode is equal 0; if it is, the test 104 is performed regularly to check if the mode has changed. If the mode is not 0, test 106 is performed to determine if the mode is equal to 2, 3 or 4. If the mode is equal to 1, then manual mode operation is initiated, otherwise automatic mode operation begins.

Mode 0 is a stand-by mode. Mode 1 is a manual mode. Mode 2 is an automatic mode in which the system comes on at dusk and operates (i.e., dispenses attractant) for three (3) hours. Mode 3 is an automatic mode in which the system comes on at dusk and operates for five (5) hours. Mode 4 is also an automatic mode in which the system operates starting at dusk for a period of three (3) hours, and starting at dawn for a period of two (2) hours.

Test 110 checks the ambient temperature, and if the temperature is below a threshold value (e.g., 55° F.), the test 110 is performed periodically to determine if the temperature has increased above the threshold value. Test 111 performs a test to determine if a fixed time has passed (e.g., two hours) since the test 110 was initiated, and if so step 112 is performed to close the fuel valve 34 (FIG. 2) and turn-off the motor 42 (FIG. 1) since the ambient temperature is low. The system then waits until dawn. Once dawn is detected test 114 is performed to determine if the system is configured to operate in mode 4. If it is, a series of steps are performed to command the system to release the attractant if the ambient temperature is high enough. Otherwise, if the system is not in operating mode 4, operation returns to test 104.

Figure 5:
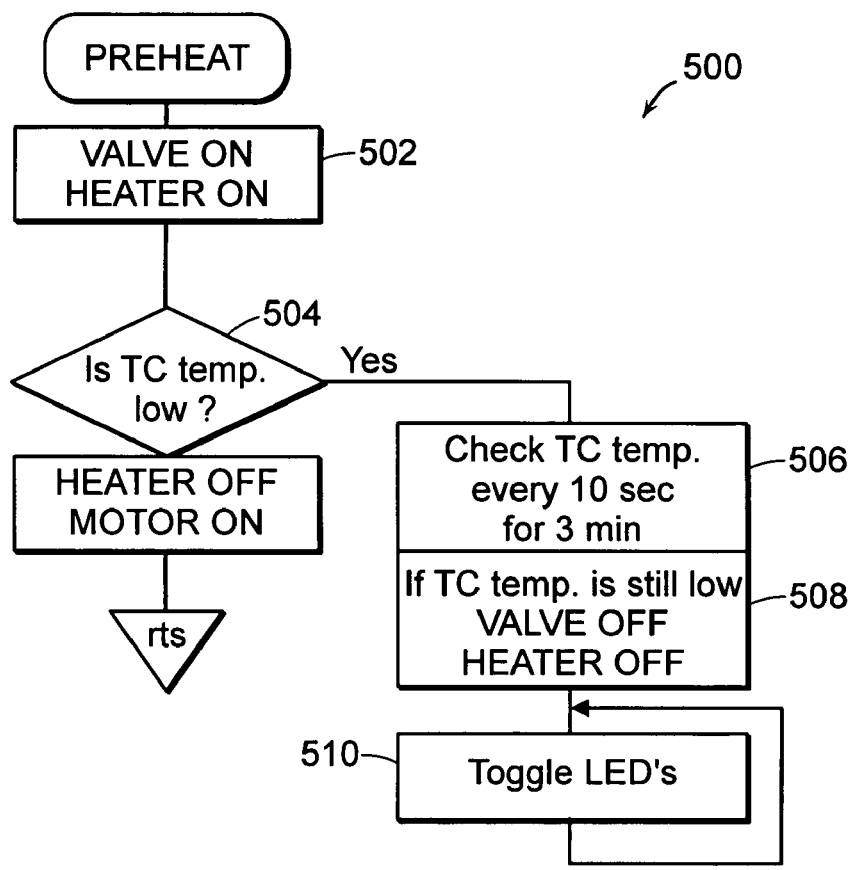
FIG. 5 is a flow chart illustration of a catalyst pre-heat routine.

FIG. 5 is a flow chart illustration of a preheat routine 500. This routine includes a step 502 that commands the valve 34 (FIG. 2) to open to start the flow of fuel, and to turn on the heater. A test 504 is then performed to determine if the catalyst temperature is low. Referring again to FIG. 3, comparator 210 also receives the amplified temperature signal on a line 62 and compares the value of the signal against a temperature threshold signal on a line 212. The comparator 210 provides a Boolean signal on a line 214 indicative of whether the amplified temperature signal is above or below the temperature threshold value. Therefore, referring again to FIG. 5, the test 504 reads the value of the Boolean signal on the line 214 (FIG. 3) to determine if the temperature is too low. If it is too low, step 506 is performed to check the temperature every ten (10) seconds or so, until the temperature is greater than the threshold value. If the temperature is not greater than the threshold value after a period of time (e.g., ten minutes), then the fuel tank 31 (FIG. 2) may be empty, and step 508 commands the valve 34 (FIG. 2) to close, and the heater 37(FIG. 2) to turn off. Step 510 is then performed to annunciate this condition by toggling the LEDs 80 (FIG. 3). If the catalyst temperature is determined in test 504 to be above the threshold as indicated by the state of the signal on the line 214 (FIG. 3), then the heater is commanded off, and the motor 42 (FIG. 1) is commanded on. The heater can be turned off since the catalyst is now at a temperature to sustain the catalytic process while fuel is passed through the catalyst.

Referring again to FIG. 3, the resistor network 56 provides a signal indicative of a sensed ambient temperature signal on a line 222, to a comparator 224. The comparator 224 also receives a voltage reference signal on the line 212 that is indicative of an ambient temperature threshold value. The comparator 224 compares the sensed signal on the line 222 against the voltage signal on the line 212 and provides a Boolean output signal on a line 228. In a first state the Boolean signal on the line 228 indicates that the ambient temperature is at or above a certain ambient temperature threshold value (e.g., 55° F.), and in a second state the signal indicates that the temperature is below the certain ambient temperature threshold value. The state of the signal on the line 228 is used in tests to determine if the ambient temperature is warm enough to allow the exothermic reactor to operate (e.g., see test 110 in FIG. 4).

A photocell 22 (FIG. 1) provides an input signal to comparator 230, which also receives the voltage threshold value on the line 232. The comparator 230 provides a Boolean output signal on a line 234 indicative of whether or not the amount of ambient light is above or below an ambient light threshold value. In a first state the Boolean signal on the line 234 indicates that the amount of ambient light is at or above the ambient light threshold value (e.g., 20 foot-candles), and in a second state the signal indicates that the amount of ambient light is below the ambient light threshold value. The signals from comparators 210, 224 and 230 are input to the controller 54. The controller also receives a reset signal from a manually controlled switch 240. The signals from the comparators are checked by the controller 54 to perform the tests illustrated in FIGS. 4–5.

The controller 54 also receives a signal on a line 250 from a mode switch, which provides a signal to the controller 54 to advance the operating mode (e.g., on an edge transition).

Figure 6:
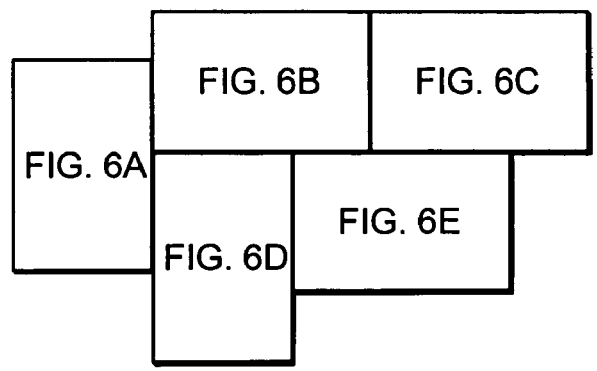
FIG. 6 is a schematic illustration of an alternative embodiment controller.
Figure 6A:
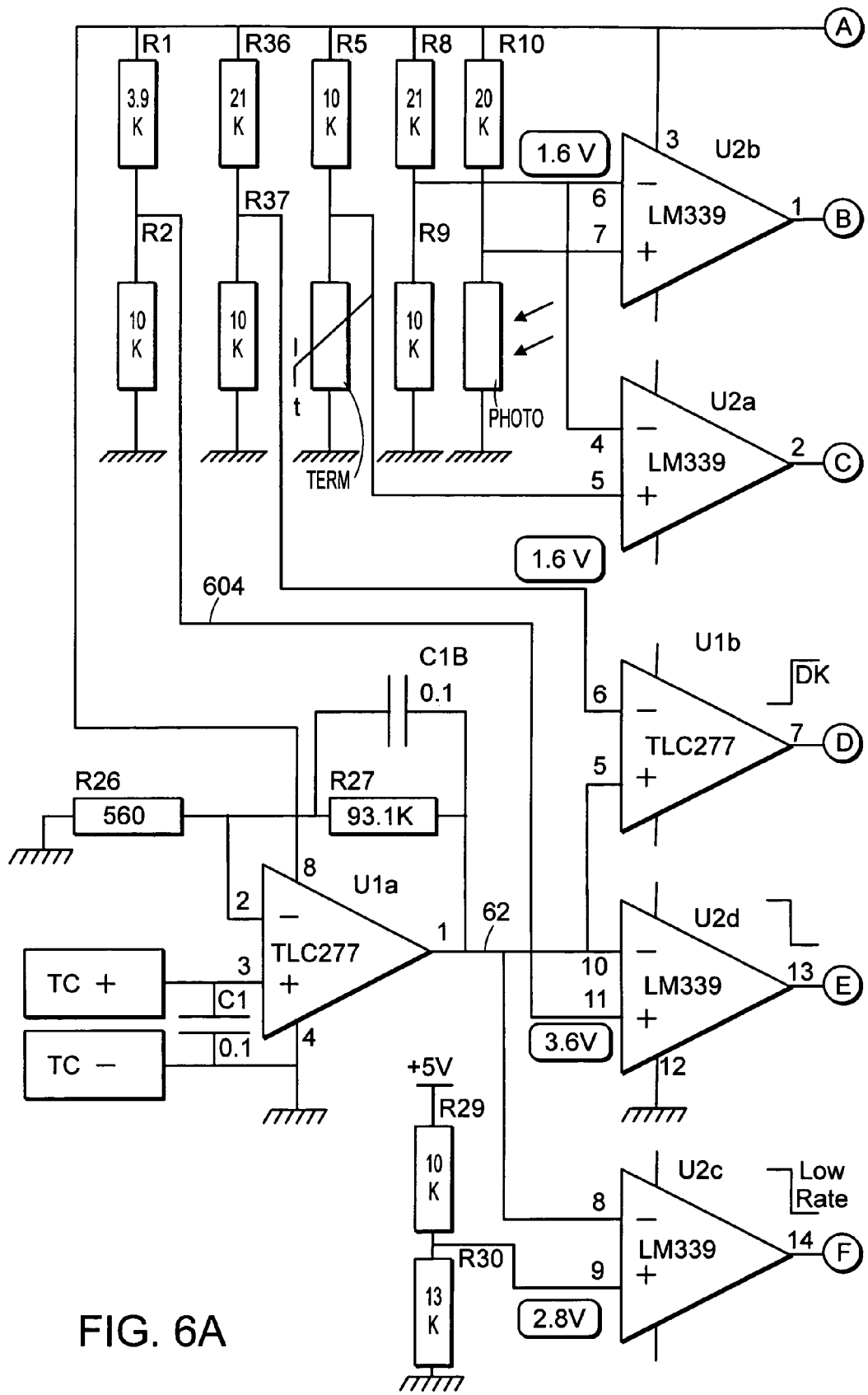
Figure 6B:
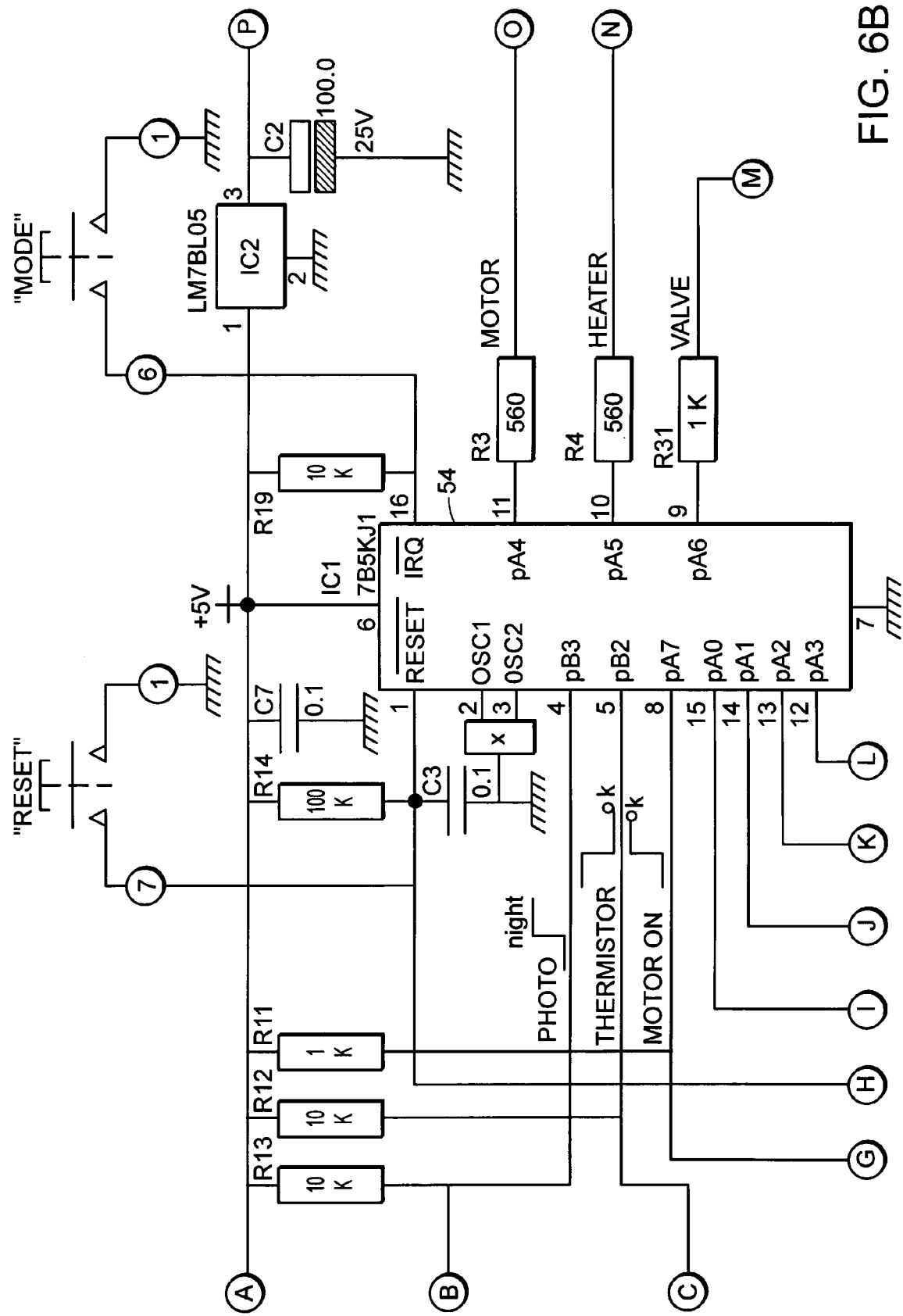
Figure 6C:
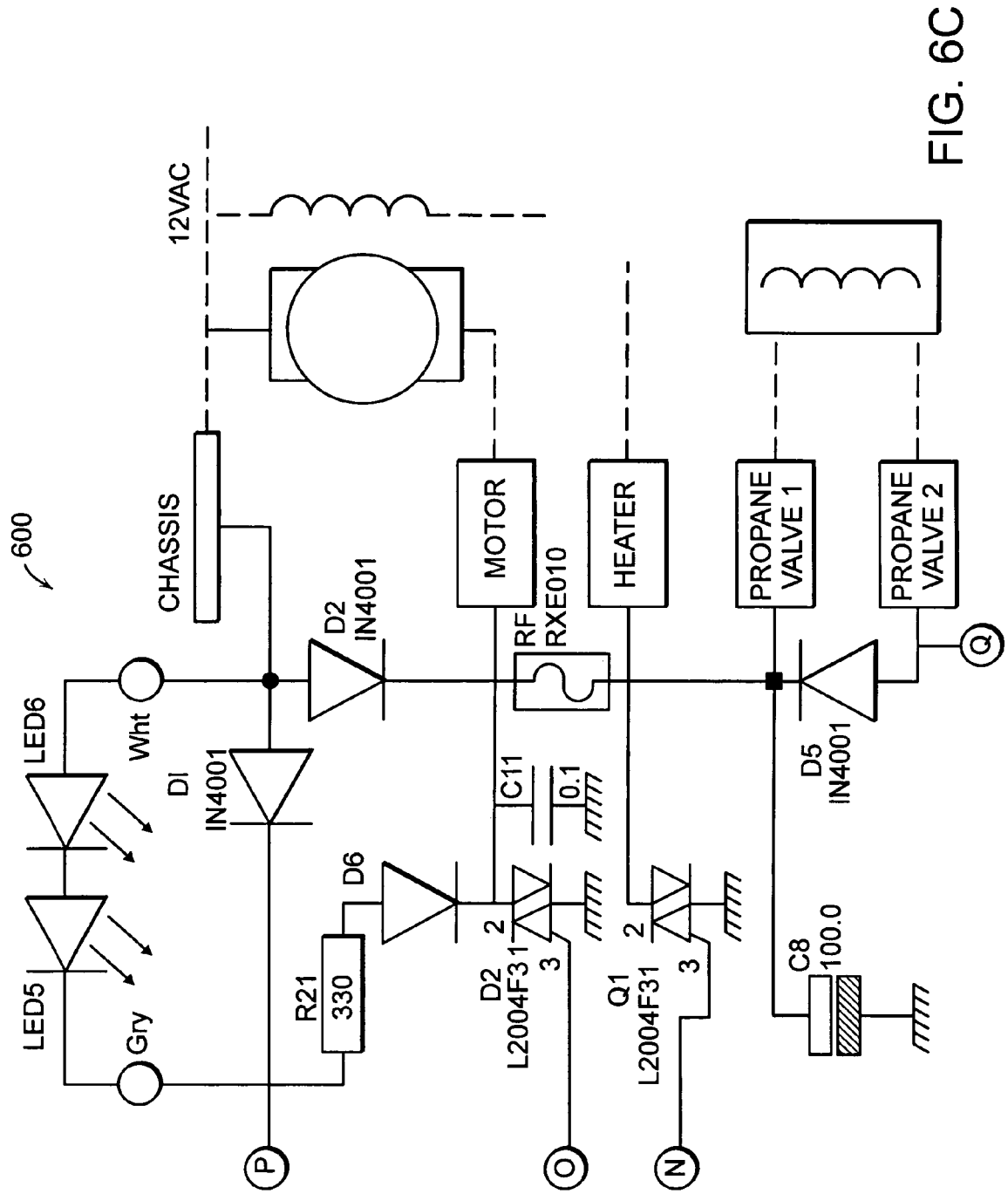
Figure 6D:
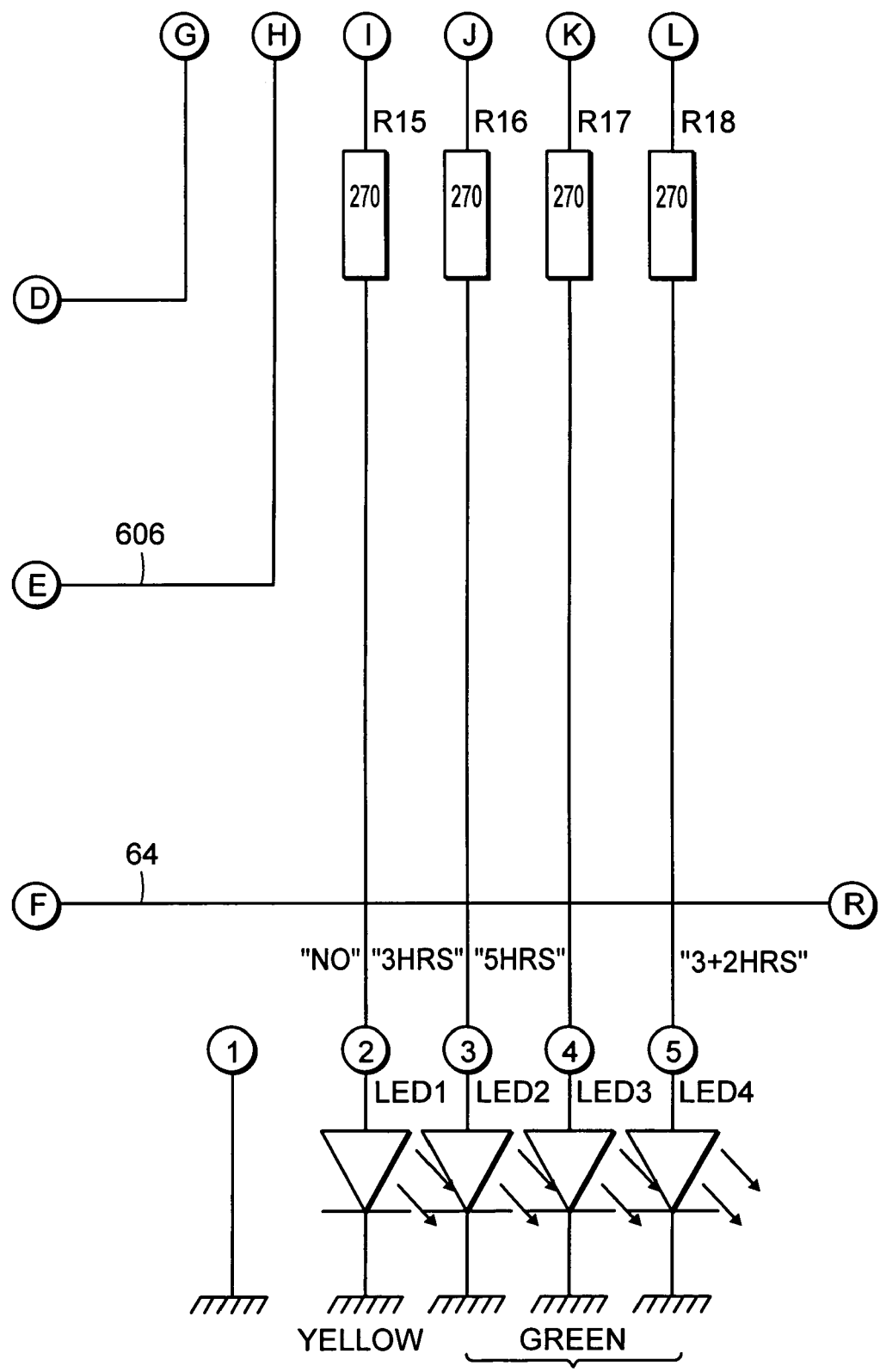
Figure 7A:
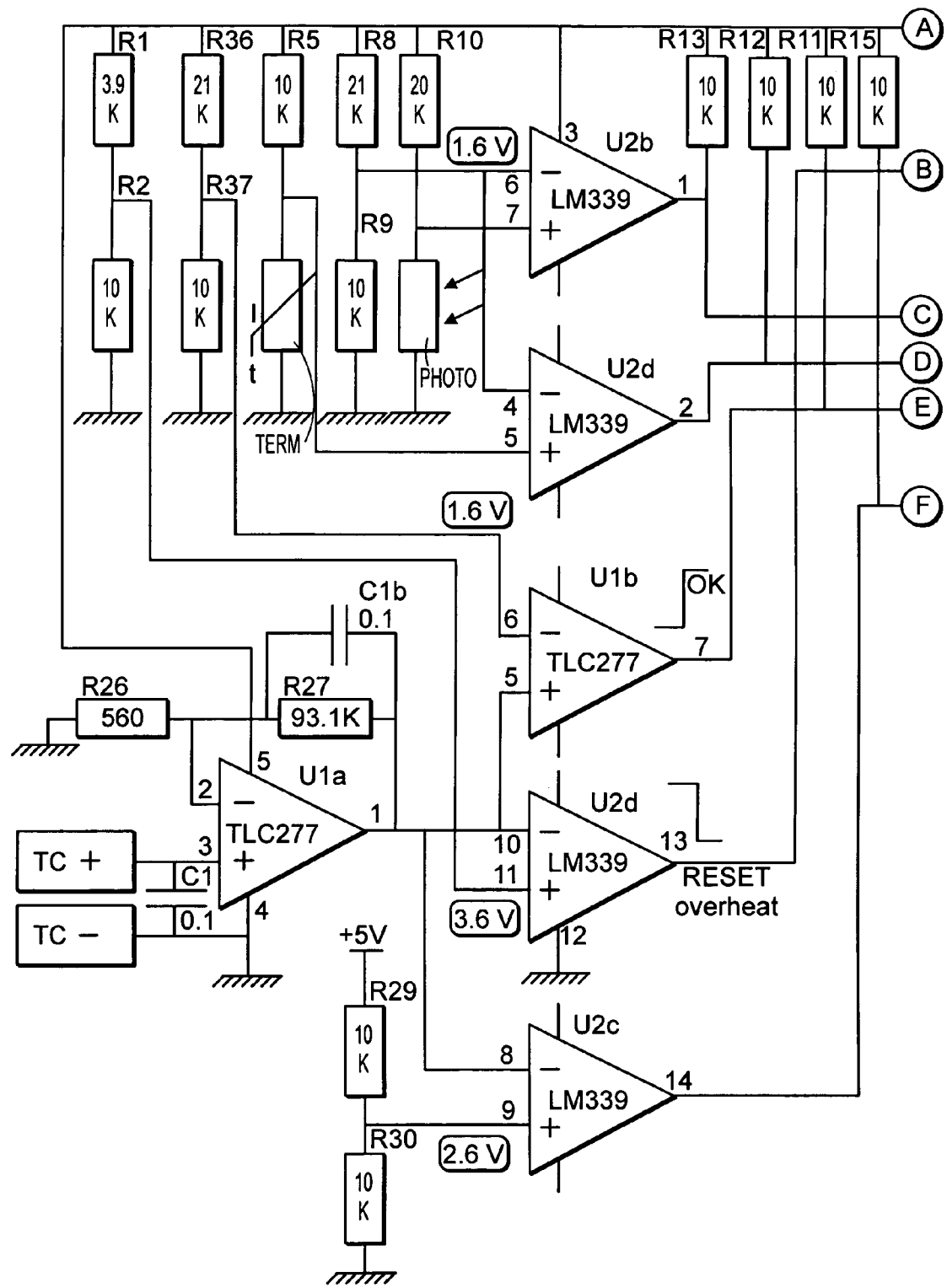
FIG. 7 is a schematic illustration of yet another alternative embodiment controller.
Figure 7B:
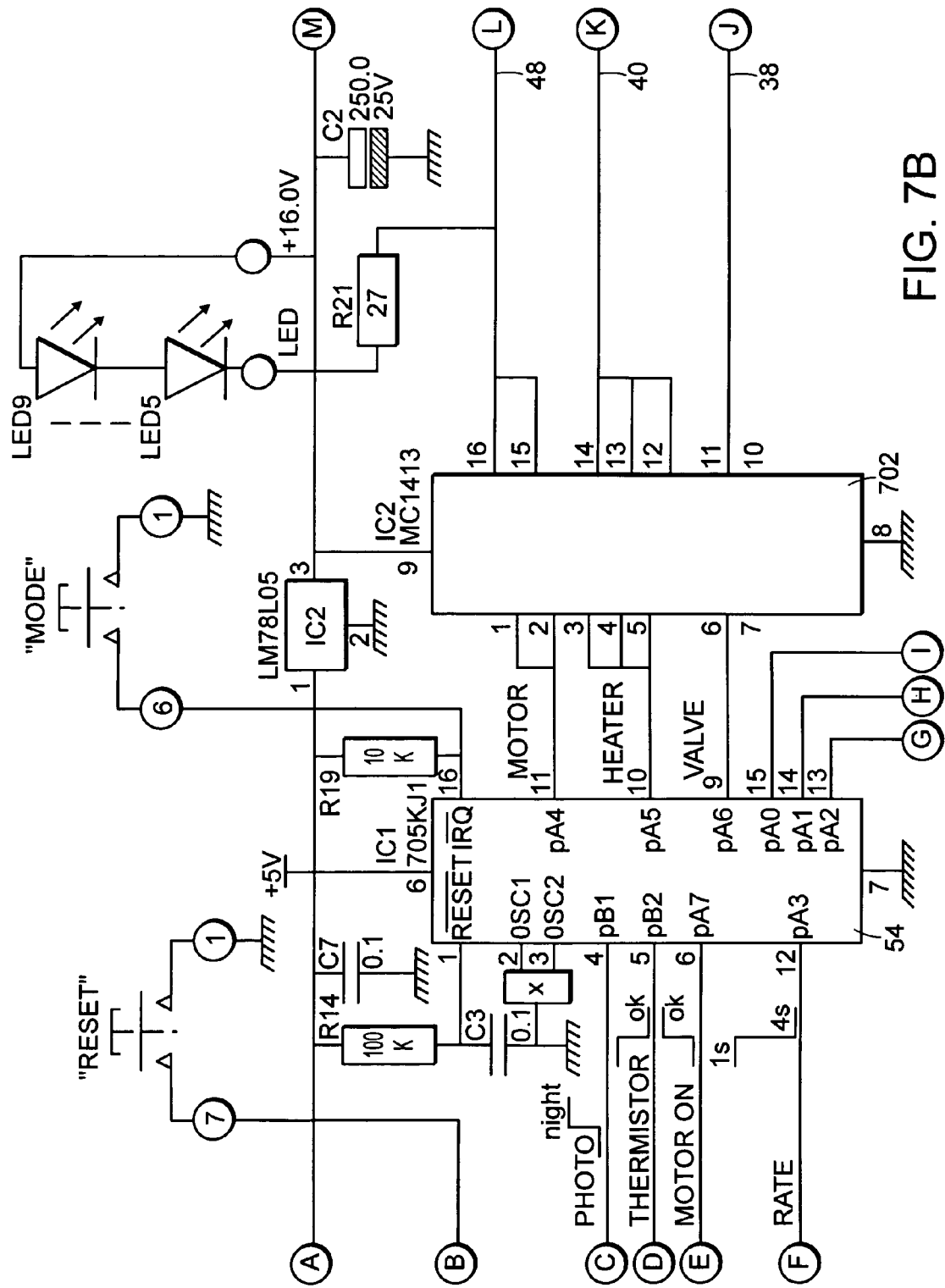
Figure 7C:
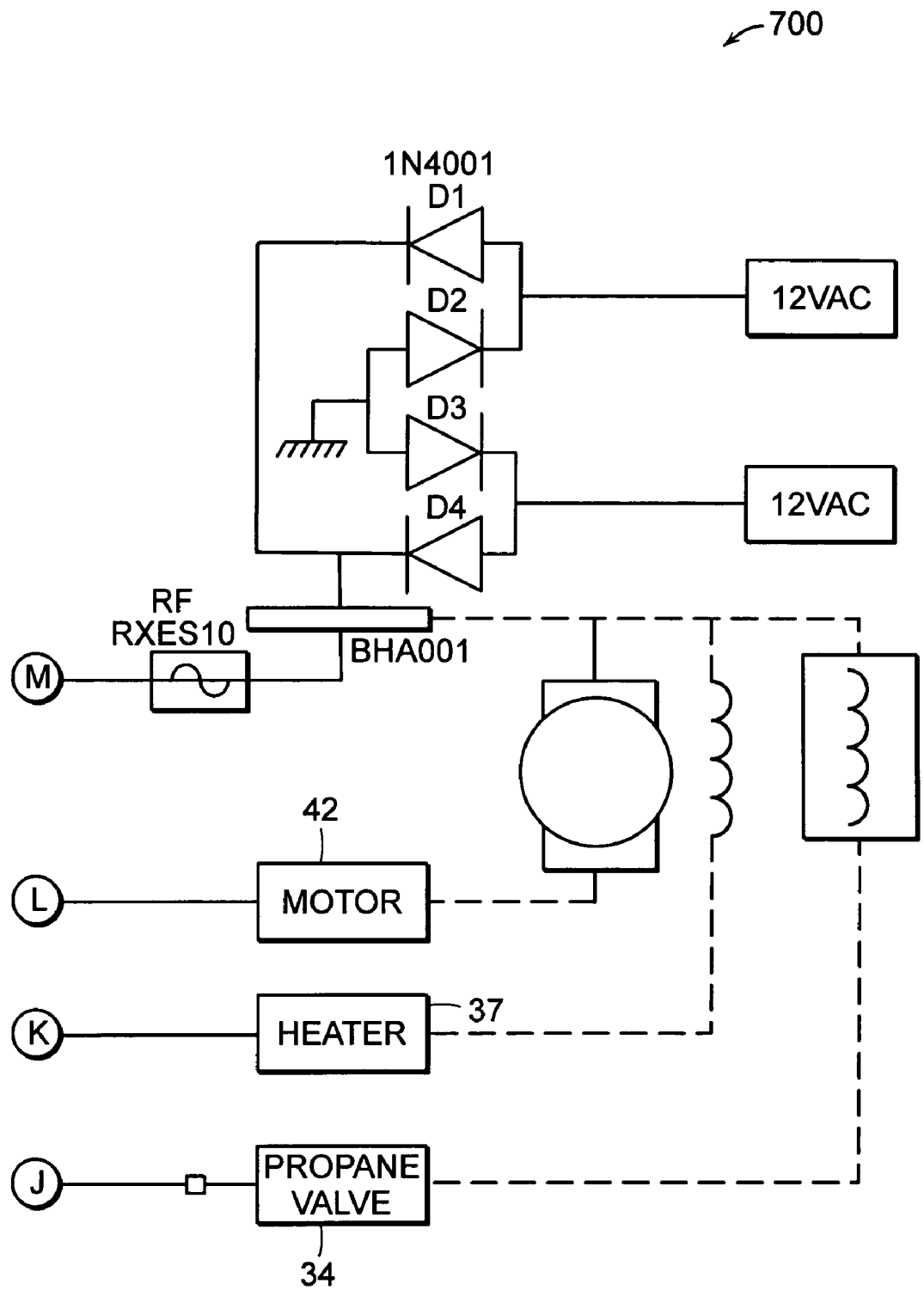
Figure 7D:
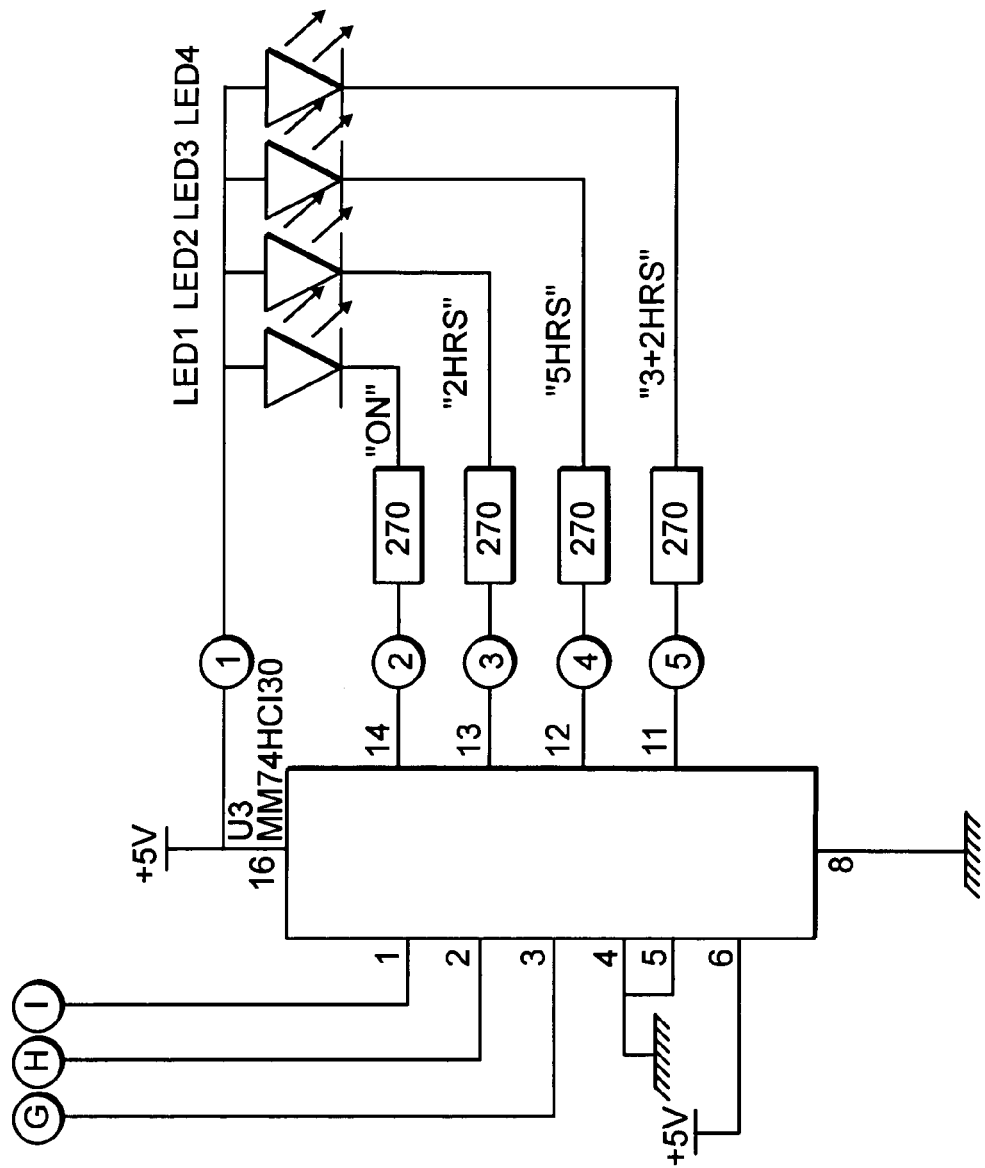

FIG. 6 is a schematic illustration of an alternative embodiment controller 600. This embodiment is substantially similar to the controller embodiment 200 illustrated in FIG. 3, with the principal exceptions of: (i) additional circuitry to detect an over heating of the catalyst temperature, and (ii) the circuit for driving the valve now includes a transistor rather than a silicon control rectifier (SCR) switch. Specifically, the amplified catalyst temperature signal on the line 62 is input to a comparator 602 that also receives a overheat threshold signal value on a line 604. If the amplified catalyst temperature signal on the line 62 is greater than the overheat threshold signal value, the comparator 602 provides an output signal on a line 606, that holds the system in reset, disabling the outputs (e.g., commanding the valve(s) to close to shut-off the flow of fuel).

In this embodiment, the controller 600 also includes a valve control logic circuit 614 responsive to the signal on the line 64 indicative of whether the catalyst temperature is above or below a certain threshold value. Dependent upon the value of the Boolean signal on the line 64, capacitor 616 can be switched in parallel with the capacitor 618. When the signal on the line 64 indicates that the catalyst temperature is below the certain threshold value, the valve control logic circuit 614 drives the valve open for a 25 millisecond duration every second. If the temperature is above the threshold, the valve control logic circuit 614 drives the valve(s) to open for 25 milliseconds every four seconds.

FIG. 7 is a schematic illustration of yet another alternative embodiment controller 700. This embodiment is substantially the same as the embodiment illustrated in FIG. 6, with the principal exception that the logic for controlling the timing of the fuel valve opening and closing is implemented in the processor 54, rather than as a separate logic circuit. Significantly, implementing the valve control logic within the processor provides flexibility in implementing various valve open and close timing as a function of the catalyst temperate. In addition, the driver circuits for driving the motor, the heater and the valve are now integrated into an integrated circuit 702.

One of ordinary skill in the art will recognize that the present invention is of course not limited to the specific valve timing and threshold values discussed herein as way example. For example, the specific valve timing and threshold values will be a function of the overall system design. In addition, although the embodiments illustrated herein employ an ON/OFF valve, the system may be modified to use a modulating valve that receives a command signal to control the flow of gas from the tank, rather than opening and closing the valve. It is further contemplated that various types of sensors may be employed. For example, it is contemplated that sensors other than thermocouples, thermistors and photocells may be used to sense the associated parameters. Also, the present invention is not limited to placing the temperature sensor that senses the exhaust gas temperature in close proximity to the catalyst. Other locations in the $CO_2$ flow path may provide sensing locations that allow fuel flow to be controlled as a function of temperature, while maintaining the exothermic reaction. Furthermore, although the control technique of the present invention has been discussed in the context of closing the loop on temperature, it is contemplated that the loop may be controlled by sensing other parameter(s) indicative of the exothermic reaction (e.g., the amount of $CO_2$ gas).

It should be further understood that although the system employs a controller 54 (FIG. 3) that receives Boolean inputs, a more complex controller may be used that, for example receives the sensed analog signal values, digitizes the values and processes the resultant digitized values to perform the control functions of the present invention. It suffices, that a number of different embodiments can be provided to enjoy the benefits of controlling the flow of fuel as a function of the exhaust gas/catalyst temperature.

Although the present invention has been shown and described with respect to several preferred embodiments thereof, various changes, omissions and additions to the form and detail thereof, may be made therein, without departing from the spirit and scope of the invention.

What is claimed is:

1. An insect lure and trap system, comprising:
   a valve that receives a gaseous fuel, and provides a regulated flow of gaseous fuel;
   means responsive to said regulated flow of gaseous fuel, for generating carbon dioxide to attract insects to a predetermined region;
   means for generating airflow that forces insects within the predetermined region into a container;
   a temperature sensor that senses a temperature of the carbon dioxide and provides a carbon dioxide temperature signal indicative thereof; and
   means responsive to said carbon dioxide temperature signal, for generating a valve command signal that regulates said valve, wherein said means for generating a valve command signal comprises means for comparing said carbon dioxide temperature signal value against a temperature reference signal value, and if said carbon dioxide temperature signal value is below said temperature reference signal, for providing a valve command signal to open and close the valve at a first frequency, and if said carbon dioxide temperature signal value is above said temperature reference signal, for providing a valve command signal to open and close the valve at a second frequency.

2. The insect lure and trap system of claim 1 further comprising:
   a light sensor that senses ambient light and provides an ambient light signal indicative thereof; and
   means for regulating the flow of gaseous fuel based on the ambient light signal.

3. The insect lure and trap system of claim 2, wherein said means for regulating the flow of gaseous fuel comprises means for comparing the ambient light signal value to an ambient light reference value and for generating a valve command signal to open the valve when the ambient light signal value is less than the ambient light reference value.

4. The insect lure and trap system of claim 2, wherein said means for regulating the flow of gaseous fuel comprises means for comparing the ambient light signal value to an ambient light reference value and for generating a valve command signal to open the valve when the ambient light signal value is greater than the ambient light reference value.

5. The insect lure and trap system of claim 1 further comprising:
   a second temperature sensor that senses an ambient temperature and provides an ambient temperature signal indicative thereof; and
   means for regulating the flow of gaseous fuel in response to the ambient temperature signal.

6. The insect lure and trap system of claim 5, wherein said means for regulating the flow of gaseous fuel comprises means for comparing the ambient temperature signal value to an ambient temperature reference value and for generating a valve command signal to open the valve when the ambient temperature signal value is greater than the ambient temperature reference value.

7. An insect lure and trap system, comprising:
   a valve that receives a gaseous fuel, and provides a regulated flow of gaseous fuel;
   means responsive to said regulated flow of gaseous fuel, for generating carbon dioxide to attract insects to a predetermined region;
   means for generating airflow that forces insects within the predetermined region into a container;
   a temperature sensor that senses a temperature of the carbon dioxide and provides a carbon dioxide temperature signal indicative thereof; and
   means responsive to said carbon dioxide temperature signal for generating a valve command signal that regulates said valve, wherein said means for generating a valve command signal comprises means for comparing said carbon dioxide temperature signal value against a temperature reference signal value, and if said carbon dioxide temperature signal value is below said temperature reference signal, for providing said valve command signal to open said valve, and if said carbon dioxide temperature signal value is above said temperature reference signal, for providing said valve command signal to close said valve.

8. The insect lure and trap system of claim 7 further comprising:
   a light sensor that senses ambient light and provides an ambient light signal indicative thereof; and
   means for regulating the flow of gaseous fuel in response to the ambient light signal.

9. The insect lure and trap system of claim 8, wherein said means for regulating the flow of gaseous fuel comprises means for comparing the ambient light signal value to an ambient light reference value, for generating a valve command signal to open the value and when the ambient light signal value is greater than the ambient light reference value.

10. The insect lure and trap system of claim 8, wherein said means for regulating the flow of gaseous fuel comprises means for comparing the ambient light signal value to an ambient light reference value and, for generating a valve command signal to open the valve when the ambient light signal value is less than the ambient light reference value.

11. The insect lure and trap system of claim 7 further comprising:
   a second temperature sensor that senses an ambient temperature and provides an ambient temperature signal indicative thereof; and
   means for regulating the flow of gaseous fuel in response to the ambient temperature signal.

12. The insect lure and trap system of claim 11, wherein said means for regulating the flow of gaseous fuel comprises means for comparing the ambient temperature signal value to an ambient temperature reference value, for generating a valve command signal to open the valve when the ambient temperature signal value is greater than the ambient temperature reference value, and for generating a valve command signal to close the valve when the ambient temperature signal value is less than the ambient temperature reference value.

* * * * *